United States Patent [19]

Yada et al.

[11] Patent Number: 4,647,598
[45] Date of Patent: Mar. 3, 1987

[54] PROCESS FOR PREPARING WATER-SOLUBLE POLYMERS

[75] Inventors: Akira Yada, Kusatsu; Shusaku Matsumoto, Kyoto; Yoshihiro Kawamori, Joyo; Takao Saito, Nagaokakyo; Tadashi Nishiyama; Yoshitugu Adachi, both of Kyoto, all of Japan

[73] Assignee: Dai-Ichi Kogyo Seiyaku Co., Ltd., Kyoto, Japan

[21] Appl. No.: 689,006

[22] Filed: Jan. 4, 1985

[30] Foreign Application Priority Data

Jan. 13, 1984 [JP] Japan .................................. 59-5236
Jan. 13, 1984 [JP] Japan .................................. 59-5237

[51] Int. Cl.$^4$ ........................... C08F 2/50; C08F 2/10; C08F 20/06; C08F 20/44
[52] U.S. Cl. ........................................ 522/3; 522/80; 522/14; 522/18; 522/72; 522/77; 522/78; 522/79; 522/84; 522/173; 522/175; 522/182; 522/910; 522/902; 526/62; 526/81
[58] Field of Search .................. 204/159.24; 522/3, 84

[56] References Cited

U.S. PATENT DOCUMENTS

| 3,023,122 | 2/1962 | de Pataky | 524/313 |
| 3,312,644 | 4/1967 | Miyairi | 525/7.2 |
| 4,325,794 | 4/1982 | Hunter | 204/159.24 |
| 4,415,417 | 11/1983 | Bush | 204/159.24 |

FOREIGN PATENT DOCUMENTS 109937 9/1976 Japan .................................. 427/53.1

Primary Examiner—Melvin I. Marquis
Assistant Examiner—A. H. Koeckert
Attorney, Agent, or Firm—Antonelli, Terry & Wands

[57] ABSTRACT

An improved process for preparing a water-soluble polymer having an excellent water solubility and a high molecular weight, which comprises subjecting a thin layer of an aqueous solution of a water-soluble vinyl monomer to polymerization on a solid support, covering the thin layer with a substantially water-insoluble organic material, e.g. a paraffin, a silicone oil or a low molecular polyethylene, and/or a slightly water-soluble or substantially water-insoluble alkylene oxide adduct at least at a point of time when the aqueous monomer solution has not freely flowed, and further continuing the polymerization.

13 Claims, No Drawings

PROCESS FOR PREPARING WATER-SOLUBLE POLYMERS

BACKGROUND OF THE INVENTION

The present invention relates to a process for preparing a water-soluble polymer having an excellent water solubility and a high molecular weight, and more particularly to a process for preparing a water-soluble high molecular weight polymer in an improved efficiency by polymerizing an aqueous solution of a water-soluble vinyl monomer in the form of a thin layer on a solid support.

Various water-soluble polymers are known, e.g. acrylamide or methacrylamide polymers, acrylic or methacrylic acid polymers and cationic polymers, and have been used for various purposes. For instance, acrylamide homopolymer, copolymers of acrylamide and other copolymerizable monomers, or alkali hydrolysis products thereof have been widely utilized as sizing agent, viscosity builder, soil improver, waste water treating agent, agent for recovering crude oil, etc. These water-soluble acrylamide polymers have been prepared by bulk polymerization, suspension polymerization, emulsion polymerization or solution polymerization. In general, a polymerization of an aqueous solution of a monomer has been mainly applied to production of high molecular weight polymers.

For obtaining polymers having a very high molecular weight and moreover having a good water solubility by means of the aqueous solution polymerization method, it is necessary to prevent a crosslinking reaction in the polymerization stage, namely formation of three-dimensional structure, as much as possible. In case of obtaining the polymers as a powder, attention must be given to prevention of occurrence of crosslinking in the heat drying stage. The higher the monomer concentration in the polymerization stage and the higher the drying temperature of the produced polymers, the more the crosslinking of the polymers is accelerated. Accordingly, it is desirable to conduct the preparation of polymers under relatively mild conditions, e.g. polymerization at a relatively low concentration of a monomer or drying at a relatively low temperature, for preventing the undesirable crosslinking reaction.

In recent years, water-soluble polymers in the form of powder are demanded rather than in the form of an aqueous solution. The preparation of the polymers under mild conditions as mentioned above which are hard to cause the crosslinking, is not preferable from an economical point of view. Accordingly, it has been attempted to develop a technique wherein the polymerization is conducted at concentrations of a monomer as high as possible and the utility cost for the powdering is reduced, and moreover the crosslinking reaction is prevented. For instance, for preventing the crosslinking of the polymers, there have been proposed a process in which an agent for preventing the crosslinking is added to polymers prior to polymerization or drying. and a process in which abnormal rise of monomer concentration during polymerization is prevented by controlling heat generation and the accompanying transpiration of water in the polymerization step as low as possible.

It is an object of the present invention to provide a process for preparing water-soluble polymers which have a very high molecular weight and moreover have an excellent solubility in water.

A further object of the invention is to provide a process for preparing water-soluble polymers in an improved efficiency with reduced occurrence of crosslinking.

These and other objects of the present invention will become apparent from the description hereinafter.

SUMMARY OF THE INVENTION

In accordance with the present invention, there is provided an improvement in a process for preparing a water-soluble high molecular weight polymer by polymerizing thin layer of an aqueous solution of a water-soluble vinyl monomer supported on a solid support, the improvement which comprises covering the thin layer with a member selected from the group consisting of a substantially water-insoluble organic material and a slightly water-soluble or substantially water-insoluble alkylene oxide adduct at a point of time when said aqueous solution has become substantially nonflowable, and continuing the polymerization.

In the process of the present invention, a thin layer of an aqueous solution of monomers is subjected to polymerization on a support, and when the aqueous solution does not substantially freely flow on the support, the surface of the thin layer of the formed gel is covered with the above-mentioned covering material, whereby the water content of the gel can be prevented from abnormally lowering owing to evaporation of water by heat of the reaction, lowering of the rate of polymerization and the degree of polymerization can be prevented because the surrounding gas such as oxygen which hinders the polymerization is shut off, and dissolution or sliminess of the surface of the produced polymer by condensed water as shown in a conventional polymerization process under a wet atmosphere can be prevented. Further, the covering material serves as a lubricant or an agent for preventing adhesion as generally used in pulverization of the polymer gel, and also prevents the polymer particles from adhering to each other in the drying step, thus improving the drying efficiency. The process of the present invention is applicable to preparation of known water-soluble vinyl polymers.

DETAILED DESCRIPTION

Representative examples of the water-soluble vinyl monomer used in the present invention are, for instance, acrylamide, methacrylamide, ethylenically unsaturated carboxylic acids such as acrylic acid. methacrylic acid and itaconic acid or their salts, ethylenically unsaturated sulfonic acids such as vinyl sulfonic acid and 2-acrylamide-2-methyl propane sulfonic acid or their salts, dialkylaminoalkyl acrylates and methacrylates, quaternary salts and salts with acids of the dialkylaminoalkyl acrylates and methacrylates, dialkylaminoalkyl acrylamides, quaternary salts and salts with acids of the dialkylaminoalkyl acrylamides, diallylamine compounds such as salts with acids of diallylamine and diallyldialkyl ammonium salts, and the like, but the water-soluble vinyl monomers are not limited thereto. The water-soluble vinyl monomers may be employed alone or in admixture thereof. Also, the water-soluble vinyl monomers may be employed with substantially water-insoluble monomers so long as the produced polymers are soluble in water, e.g. hydrophobic vinyl monomers such as acrylonitrile, acrylic or methacrylic acid esters, vinyl acetate and styrene.

Representative examples of the substantially water-insoluble organic material used in the present invention for covering the thin layer are, for instance, paraffins such as liquid paraffins and solid paraffins, silicone oils or greases, organic resins. e.g. polyolefins such as low molecular polyethylene and low molecular polypropylene, and the like, but the organic materials are not limited to the exemplified ones. The organic materials may be employed alone or in admixture thereof. The organic materials used as a covering material which are flowable in itself may be employed either as they are, or in the form of a solution in a solvent or an aqueous emulsion or dispersion. In case that the organic materials are solid, jelly or highly viscous materials, they are usually employed in the form of a solution in a solvent or an aqueous emulsion or dispersion from the viewpoint of easiness in handling.

Representative examples of the slightly water-soluble or substantially water-insoluble alkylene oxide adduct used in the present invention as a covering material are, for instance, addition reaction products of alkylene oxides onto aliphatic alcohols having 1 to 20 carbon atoms, alkylphenols such as nonylphenol, octylphenol and dodecylphenol, fatty acids having 4 to 22 carbon atoms such as lauric acid, myristic acid, palmitic acid, stearic acid and oleic acid, polyols such as glycerol, trimethylolpropane, pentaerythritol and sorbitol or partial fatty acid esters of the polyols, and the like, but the alkylene oxide adducts are not limited to the exemplified ones. The alkylene oxide adducts may be employed alone or in admixture thereof.

The alkylene oxide comprises a compound having an epoxy group such as propylene oxide, butylene oxide or an epihalohydrin, and an alkylene oxide having a large hydrophilic property such as ethylene oxide may be employed so long as the obtained addition reaction product is slightly soluble in water or substantially insoluble in water.

The molecular weight of the alkylene oxide adduct is not particularly limited, but is usually from about 500 to about 20,000. The alkylene oxide adduct having a high flowability may be employed as it is or in the form of a solution in a solvent or an aqueous emulsion or dispersion. In case that the alkylene oxide adduct has a low or no flowability, e.g. grease-like, high viscous or solid adduct, the adduct is employed in the form of a solution in a solvent such as oils or alcohols or in the form of an aqueous emulsion or dispersion.

The covering material is employed at least in an amount sufficient to cover the whole surface of the polymer gel on the support, and in general the objects of the invention can be attained by using it in an amount such that it forms a very thin layer or film. In general, the amount of the covering material is from 0.01 to 5% by weight, preferably 0.1 to 1.0% by weight. based on the polymer gel. If the amount is more than 5% by weight, the water solubility of the produced polymer is impaired, and upon preparing an aqueous solution of the polymer, a turbidity appears, the polymer is suspended or the covering material rises to the surface of the aqueous polymer solution.

In the process of the present invention, an aqueous solution of a water-soluble vinyl monomer is subjected to polymerization in the form of a thin layer supported on a solid support in a known polymerization manner. The solid support used in the present invention includes, for instance, a dish-like, square-shaped or cylindrical vessel and a movable belt, but are not limited thereto.

The concentration of the water-soluble vinyl monomer in the aqueous solution subjected to the polymerization varies depending on the solubility of the monomer and so on, but it is preferable that the concentration is as high as possible. For instance, in case of preparing acrylamide polymers, namely homopolymer of acrylamide and copolymers of acrylamide and other polymerizable vinyl monomers, the concentration of the monomer is from 20 to 60% by weight, preferably 30 to 45% by weight. In that case, the aqueous solution is preferably adjusted to pH 8 to 12. More concretely, in case of acrylamide homopolymer, the concentration of the monomer is from 20 to 50% by weight, preferably 25 to 45% by weight. In case of copolymers of acrylamide and an anionic or non-ionic vinyl monomer such as sodium acrylate, alkyl acrylates or acrylonitrile, the concentration of the monomer is from 20 to 60% by weight, preferably 30 to 50% by weight. In case of preparing water-soluble cationic polymers, the concentration of the monomer is from 50 to 85% by weight, preferably 60 to 80% by weight. In that case, the aqueous solution is preferably adjusted to pH 8 to 12. More concretely, in case of the homopolymer of a water-soluble cationic vinyl monomer such as a quaternary salt or a salt with an acid of a dialkylaminoalkyl acrylate or methacrylate, the concentration of the monomer is from 65 to 85% by weight, preferably 70 to 80% by weight. In case of the copolymer of the water-soluble cationic vinyl monomer and other polymerizable vinyl monomers such as acrylamide, the concentration of the monomer is from 50 to 85% by weight, preferably 60 to 80% by weight.

The aqueous solution of a monomer is supported in the form of a thin layer on a solid support. The thickness of the thin layer is from about 3 to about 30 mm, especially about 5 to about 15 mm. When the thickness of the layer is less than 3 mm, the productivity becomes very low and it is uneconomical. When the thickness of the layer is more than 30 mm, it is difficult to satisfactory remove the heat of reaction generated during the polymerization and there is a case that the water-solubility of the produced polymer is remarkably lowered due to occurrence of crosslinking. Preferably, the thickness of the aqueous solution layer is at most 10 mm.

The polymerization can be carried out by a usual process. e.g. a thermal polymerization using a known thermally activatable initiator such as a persulfate or an azo initiator, a redox polymerization process using a known redox initiator such as a combination of a persulfate and an amine compound or a combination of a persulfate and a sulfite, a photopolymerization process using a known photoinitiator such as benzoin or a benzoin alkyl ether, and a radiation-initiated polymerization. When the aqueous monomer solution has not freely flowed after starting the polymerization, the resulting polymer gel is covered by applying the covering material to the gel, for instance, by means of coating, spraying or the like. After the covering, the polymerization is further continued. The thus produced polymer has a high molecular weight and moreover has an excellent solubility in water. Preferably, the heat generated by the polymerization is controlled by applying hot or cold water to the back of the support during the polymerization. Before covering the thin layer of the aqueous monomer solution, the polymerization is preferably carried out in the substantial absence of oxygen which exerts a bad influence on the polymerization. The dissolved oxygen in the aqueous monomer solution is removed by passing an inert gas such as nitrogen gas through the aqueous solution, and oxygen present in the polymerization system is removed by replacing the air in the system with an inert gas such as nitrogen gas. It is desirable that the concentration of oxygen in the polymerization atmosphere is at most 0.5% by volume and the concentration of dissolved oxygen in the aqueous monomer solution is at most 0.5 p.p.m. After covering the thin layer of the aqueous monomer solution, it is possible to decrease or stop the introduction of an inert gas into the polymerization system, since the surrounding gas is shut off by the layer of the covering material. In general, the polymerization is carried out for 30 to 180 minutes.

The photopolymerization by irradiation of light rays such as ultraviolet rays is advantageous. Since the induction period up to initiation of the polymerization is very short and the polymerization starts at approximately the same time with the irradiation, the aqueous monomer solution promptly loses its free flowability and, accordingly, it is possible to cover the thin layer at approximately the same time with feed of the aqueous monomer solution to the support and the procedure is simplified. Also, the time required in the photopolymerization is shorter than a thermal polymerization.

In case of the photopolymerization by irradiation of light rays such as ultraviolet rays or γ-rays, it is possible to conduct a continuous polymerzation by continuously supplying an aqueous solution containing a monomer and a photoinitiator onto a moving support, e.g. an endless belt, in the form of a thin layer, irradiating light rays to the thin layer of the solution to polymerize the monomer, and continuously peeling off the produced polymer layer.

The photopolymerization is carried out by subjecting an aqueous solution of a monomer to irradiation of light rays, e.g. ultraviolet rays having a wavelength of 300 to 500 mμ, especially 300 to 450 mμ, more especially 350 to 400 mμ with an intensity of 2 to 100 W/m², especially 2 to 50 W/m², more especially 10 to 20 W/m². The amount of the photoinitiator is usually from about 0.001 to about 0.5% by weight based on the monomer. The relative humidity in the polymerization system is usually from 50 to 100%. The polymerization is carried out usually for about 10 to about 60 minutes, especially 10 to 30 minutes. The irradiation of light may be conducted in multistages. In that case, the intensity of light may be 0 W/m² in a certain stage.

In general, water-soluble polymers are sticky and adhere to the surface of a solid support. It is desirable from the viewpoint of workability that the layer of the produced polymer is easily peeled off from the support. For this purpose, it is known to use a support coated with a synthetic resin or a support having a polished surface. The peelability of the polymer layer from the support can be further improved by applying a tetrafluoroethylene-ethylene copolymer to the surface of the support, for instance, by means of coating of the copolymer or affixing of the copolymer film with an adhesive. Moreover, when such a covered support is used, the conversion of monomer is improved and the polymer is produced in a higher yield as compared with a known coating material.

Also, it is known that the photopolymerization efficiency is raised by using a support having a high reflective surface such as a mirror finished stainless steel. The photopolymerization efficiency equal to or higher than that obtained by the use of a mirror finished stainless steel support is obtained by using a support having a metallized fluorine-containing resin film which is provided on the surface of the support so that the metal deposited layer contacts the support. In that case, it is not necessary to use an expensive material such as a mirror finished stainless steel. Various fluorine-containing resins can be used for this purpose. The use of a tetrafluoroethylene-ethylene copolymer is preferred in point of improvements in peelability and conversion. The metal deposited layer can be formed in a usual manner, for instance, by vapor deposition such as vaccum deposition. The metal includes, for instance, aluminum, chromium, nickel, and a mixture thereof.

The crosslinking of polymers may occur during the polymerization, particularly in photopolymerization. Since the produced polymer or a part of the produced polymer is rendered insoluble in water, the crosslinking must be avoided. For this purpose, it is effective to add a combination of (a) an anionic surfactant having —SO₃⁻ group and/or a non-ionic surfactant and (b) an aliphatic tertiary amine to an aqueous solution of monomers prior to starting the polymerization, whereby the crosslinking is prevented and a high molecular weight polymer is produced. The use of such an additive is particularly effective for the production of acrylamide or methacrylamide polymers and acrylic or methacrylic acid polymers by photopolymerization. The surfactant is employed in an amount of 0.01 to 10% by weight based on the monomer. The aliphatic tertiary amine is employed in an amount of 0.001 to 5% by weight.

Examples of the anionic surfactant having —SO₃⁻ group are, for instance, (1) an alkyl sulfate or its salt of the formula: $C_2H_{(2n+1)}OSO_3^-$ wherein n is an integer of 8 to 24, such as lauryl sulfate or stearyl sulfate. (2) an alkylarylsulfonate of the formula:

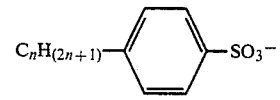

wherein n is an integer of 8 to 20, such as dodecylbenzenesulfonate or tetradecylbenzenesulfonate, (3) an alkylnaphthalenesulfonate formaldehyde condensate of the formula:

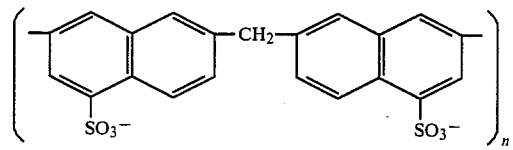

(4) a dialkyl sulfosuccinate of the formula:

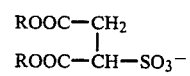

wherein R is an alkyl group having 4 to 20 carbon atoms, and (5) a polyoxyalkylene alkyl ether sulfate of the formula: $C_nH_{(2n+1)}C(CH_2CH_2O)_mCH_2CH_2OSO_3^-$ wherein n is an integer of 8 to 20 and m is 0 or an integer of 1 to 30. The anionic surfactants may be employed alone or in admixture thereof.

Examples of the non-ionic surfactant are, for instance, (1) a polyoxyethylene alkylphenyl ether of the formula:

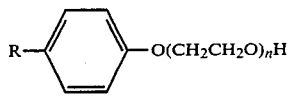

wherein R is an alkyl group having 3 to 20 carbon atoms and n is an integer of 8 to 100, such as polyoxyethylene nonylphenyl ether (n=12) or polyoxyethylene octylphenyl ether (n=15), (2) a polyoxyethylene alkyl ether of the formula: $R-O-(CH_2CH_2O)_nH$ wherein R is an alkyl group having 8 to 24 carbon atoms and n is an integer of 8 to 100 carbon atoms, such as polyoxyethylene lauryl ether (n=15) or polyoxyethylene oleyl ether (n=12), (3) a polyethylene glycol fatty acid ester of the formula: $R-COO(CH_2CH_2O)_nH$ wherein R is an alkyl group having 8 to 20 carbon atoms and n is an integer of 8 to 100, such as polyethylene glycol oleic acid ester (n=18), and (4) a polyoxyethylene sorbitan ester such as polyoxyethylene sorbitan monostearate (n=20). The non-ionic surfactants may be employed alone or in admixture thereof. It is desirable to use a non-ionic surfactant which is soluble in water at ordinary temperature.

Water-soluble tertiary amines of the formula: $N(R_1R_2R_3)$ wherein $R_1$, $R_2$ and $R_3$ are a lower alkyl group having 1 to 3 carbon atoxs, a hydroxyalkyl group having 1 to 3 carbon atoms or polyoxyethylene, are employed as the aliphatic tertiary amine. Examples of the aliphatic tertiary amine are, for instance, trimethylamine, triethylamine, dimethylethylamine, methyldiethylamine, triethanolamine, methyldiethanolamine, dimethylethanolamine and ethyldiethanolamine.

The ratio of the surfactant (a) to the aliphatic tertiary amine (b) is important for attaining the above-mentioned purpose. The ratio of the tertiary amine to the surfactant is 0.01 to 10:1 by weight, preferably 0.1 to 1:1 by weight.

The higher the monomer concentration of an aqueous solution of a monomer, the more the crosslinking of the produced polymer is easy to occur. For preventing the crosslinking, it is also effective to add a water-soluble cellulose derivative to an aqueous solution of a monomer. The use of the water-soluble cellulose derivative also improves the peelability of the produced polymer. Examples of the water-soluble cellulose derivative usable for this purpose are, for instance, carboxymethyl cellulose, hydroxypropyl cellulose, hydroxyethyl cellulose, methyl cellulose and carboxymethyl hydroxypropyl cellulose. The water-soluble cellulose derivative is employed in an amount of 0.01 to 10% by weight, preferably 0.1 to 5% by weight, based on the monomer.

When it is desired to produce acrylamide polymers having a low molecular weight by photopolymerization, e.g. irradiation of ultraviolet rays to an aqueous solution of a monomer. it can be attained by adding a hypophosphite or a combination of a hypophosphite and a tertiary amine to an aqueous solution of a monomer. It is possible to control the molecular weight of the produced polymer by varying the amounts of the hypophosphite and the tertiary amine. The amount of the hypophosphite is selected from 0.001 to 1.0% by weight, preferably 0.01 to 0.5% by weight, based on the monomer. The amount of the tertiary amine is selected from 0.01 to 5.0% by weight, preferably 0.01 to 2.5 % by weight, based on the monomer. Examples of the hypophosphite are, for instance, sodium hypophosphite, potassium hypophosphite, ammonium hypophosphite and tertiary amine salts of hypophosphorous acid. Examples of the tertiary amine are, for instance, trimethylamine, triethylamine, dimethylethylamine, methyldiethylamine, triethanolamine, methyldiethanolamine, dimethylethanolamine and ethyldiethanolamine.

In case of preparing water-soluble cationic polymers by photopolymerization, formation of the crosslinked water-insoluble polymers is prevented by adding a hypophosphite such as an alkali metal hypophosphite or ammonium hypophosphite to an aqueous solution of a monomer. In that case, the hypophosphite is employed in an amount of at least 1 p.p.m., preferably 10 to 500 p.p.m.. based on the monomer.

The water-soluble polymers produced in the form of an aqueous gel by polymerizing an aqueous solution of a monomer is usually pulverized into particles and dried. Since the water-soluble polymers are sticky, the pulverized gel particles are easy to adhere to each other to form agglomerates and consequentially the drying efficiency is lowered. The polymerization of an aqueous monomer solution in the presence of a dialkyl sulfosuccinate is effective for preventing agglomeration of gel particles of acrylamide or methacrylamide polymers in pulverization and drying steps. Examples of the dialkyl sulfosuccinate are, for instance, sodium dibutyl sulfosuccinate, sodium di-2-ethylhexyl sulfosuccinate, sodium dinonyl sulfosuccinate, sodium butyl-2-ethylhexyl sulfosuccinate, sodium 2-ethylhexyllauryl sulfosuccinate, and the like. The dialkyl sulfosuccinates may be employed alone or in admixture thereof, and also may be employed in combination with a minor amount of other surfactants such as non-ionic surfactants and anionic surfactants. The amount of the dialkyl sulfosuccinate used for the above purpose is from 0.001 to 5%, preferably 0.05 to 0.5%, based on the solid matter of the aqueous polymer gel.

The water-soluble polymers, particularly polymers produced by photopolymerization, are easy to crosslink during the drying, thus are insolubilized in water. For preventing the insolubilization in water of photopolymerized acrylamide polymers and acrylic acid polymers caused by drying, it is effective to add an aminocarboxylic acid having hydroxyl group to the polymers prior to drying the polymers. The effect can be further improved by using the aminocarboxylic acid having OH group in combination with an aminocarboxylic acid having no OH group or a urea compound such as urea, thiourea, ethyleneurea or guanidine salts, which is preferably employed in a minor amount. The aminocarboxylic acid having OH group or the above combination is employed in an amount of 0.01 to 10% by weight, preferably 0.1 to 5% by weight, based on the polymer. Examples of the aminocarboxylic acid are, for instance, hydroxyethylaminopropionic acid, dihydroxyethylaminopropionic acid, methylhydroxyethylaminopropionic acid, ethylhydroxyethylaminopropionic acid, hydroxyethylaminoacetic acid, dihydroxyethylaminoacetic acid, methylhydroxyethylaminoacetic acid, and the salts thereof. Examples of the aminocarboxylic acid having no OH group are, for instance, l-alanine, glycine, glutamic acid, α-alanine, serine and cysteine.

The present invention is more specifically described and explained by means of the following Examples in which all % and parts are by weight unless otherwise noted. It is to be understood that the present invention is not limited to the Examples, and various changes and modifications may be made in the invention without departing from the spirit and scope thereof.

EXAMPLES 1 TO 4 AND COMPARATIVE EXAMPLES 1 AND 2

A polymerization vessel equipped with a jacket (a box-shaped vessel having a size of 200 mm in length, 300 mm in width and 50 mm in height and having no upper cover) was placed in a box-shaped small chamber filled with nitrogen gas. An aqueous solution of 150 g of acrylamide, 38 g of acrylic acid and 20 g of sodium hydroxide dissolved in 275 g of demineralized water was degassed with nitrogen gas to remove the dissolved oxygen in a 1 liter cylindrical degassing vessel. To the aqueous monomer solution were then added 5 ml of a 5% aqueous solution of potassium persulfate and 5 ml of a 5% aqueous solution of sodium sulfite. After degassing with nitrogen gas for several minutes, the aqueous solution was introduced to the polymerization vessel, and the polymerization was started, while passing water of 25° C. through the jacket. After about 10 minutes, it was observed that the viscosity of the aqueous monomer solution gradually increased. The aqueous monomer solution showed a gentle flowing state 15 minutes after starting the polymerization. At that point of time, the organic covering material shown in Table 1 was thinly coated by a brush on the surface of the polymer gel to cover the whole surface, and the introduction of nitrogen gas to the chamber was stopped. The polymerization was further continued, and was ended 180 minutes after starting the polymerization.

After observing the obtained polymer gel, it was ground by a meat grinder and dried at 80° C. for 120 minutes to give a powder. The polymerization conversion, intrinsic viscosity (dl/g) and water solubility of the obtained polymer powder were measured by the following methods.

Polymerization conversion

The conversion was measured by a $KBrO_3$ method.

Intrinsic viscosity

The intrinsic viscosity (dl/g) was measured in a 1N-NaCl solution at 30° C. by using a Cannon-Fenske viscometer.

Water solubility

To 100 g of distilled water was added 0.1 g of the polymer powder, and it was dissolved by stirring for 5 hours with a magnetic stirrer (about 500 r.p.m.). The amount of the undissolved swelled material present in the resulting solution was determined by the naked eye to estimate the water solubility.

The results are shown in Table 1.

In Table 1, the non-ionic surfactant used for dispersing a solid paraffin was polyoxyethylene nonyl phenyl ether (HLB 12), and it was employed in an amount of 5 parts per 100 parts of the solid paraffin in preparing an aqueous emulsion of the solid paraffin. The non-ionic surfactant used for emulsifying a polydimethylsiloxane silicone oil was polyoxyethylene nonyl phenyl ether (HLB 12), and it was employed in an amount of 10 parts per 100 parts of the silicone oil in preparing an aqueous emulsion of the silicone oil. The non-ionic surfactant used for emulsifying polyethylene was polyoxyethylene nonyl phenyl ether (HLB 10), and it was employed in an amount of 10 parts per 100 parts of polyethylene in preparing an aqueous emulsion of polyethylene.

EXAMPLES 5 TO 8 AND COMPARATIVE EXAMPLES 3 AND 4

The procedures of Examples 1 to 4 and Comparative Examples 1 and 2 were repeated except that the stopping of nitrogen introduction made after coating of the aqueous monomer solution with the covering material was not made.

The results are shown in Table 1.

TABLE 1

|  | Covering material | State of polymer gel | Conversion (%) | Intrinsic viscosity (dl/g) | Water solubility |
|---|---|---|---|---|---|
| Ex. 1 | 20% Aqueous emulsion of solid paraffin (mp 55° C.) emulsified with non-ionic surfactant | Slightly soft surface, but homogeneous all over | 99.4 | 23.4 | No water-insoluble gel and no turbidity (nearly transparent) |
| Ex. 2 | Polydimethylsiloxane silicone oil (100 cSt at 25° C.) | Homogeneous all over | 99.2 | 23.8 | No water-insoluble gel and no turbidity (nearly transparent) |
| Ex. 3 | 30% Aqueous emulsion of silicone oil of Ex. 2 emulsified with non-ionic surfactant | " | 99.3 | 23.0 | No water-insoluble gel and no turbidity (nearly transparent) |
| Ex. 4 | 30% Aqueous emulsion of polyethylene (MW 3000) emulsified with non-ionic surfactant | " | 99.5 | 22.8 | No water-insoluble gel and no turbidity (nearly transparent) |
| Ex. 5 | Same as Ex. 1 | " | — | — | — |
| Ex. 6 | Same as Ex. 2 | " | — | — | — |
| Ex. 7 | Same as Ex. 3 | " | — | — | — |
| Ex. 8 | Same as Ex. 4 | " | — | — | — |
| Com. Ex. 1 | None | Hard film having a pitted surface in part being formed on the surface portion, and many bubbles being present in the inside portion | 92.3 | 16.5 | A large amount of water-insoluble gel being present |
| Com. Ex. 2 | None (humidity of atmosphere being kept at 60% by wet nitrogen gas) | The surface portion being soft and partly in the semi-dissolved state, and the inside portion being hard and having many bubbles | 93.6 | 18.5 | Little water-insoluble gel |
| Com. | None | The surface being very soft | 82 | 14.2 | A large amount of |

TABLE 1-continued

| | Covering material | State of polymer gel | Conversion (%) | Intrinsic viscosity (dl/g) | Water solubility |
|---|---|---|---|---|---|
| Ex. 3 | | and weak and polymerization being insufficient | | | water-insoluble gel being present |
| Com. Ex. 4 | None (humidity of atmosphere being kept at 60% by wet nitrogen gas) | The surface portion being soft and being in semi-dissolved state in part | 80 | 13.8 | Little water-insoluble gel |

EXAMPLES 9 TO 12 AND COMPARATIVE EXAMPLES 5 AND 6 the aqueous monomer solution with the covering material was not made.

The results are shown in Table 2.

TABLE 2

| | Covering material | State of polymer gel | Conversion (%) | Intrinsic viscosity (dl/g) | Water solubility |
|---|---|---|---|---|---|
| Ex. 9 | 20% Aqueous emulsion of solid paraffin (mp 55° C.) emulsified with non-ionic surfactant | Slightly soft surface, but homogeneous all over | 99.0 | 7.2 | No water-insoluble gel, transparent solution |
| Ex. 10 | Polydimethylsiloxane silicone oil (100 cSt at 25° C.) | Homogeneous all over | 98.8 | 6.8 | No water-insoluble gel, transparent solution |
| Ex. 11 | 30% Aqueous emulsion of silicone oil of Ex. 10 emulsified with non-ionic surfactant | " | 98.5 | 6.7 | No water-insoluble gel, transparent solution |
| Ex. 12 | 30% Aqueous emulsion of polyethylene (MW 3000) emulsified with non-ionic surfactant | " | 99.2 | 7.0 | No water-insoluble gel, transparent solution |
| Ex. 13 | Same as Ex. 9 | " | — | — | — |
| Ex. 14 | Same as Ex. 10 | " | — | — | — |
| Ex. 15 | Same as Ex. 11 | " | — | — | — |
| Ex. 16 | Same as Ex. 12 | " | — | — | — |
| Com. Ex. 5 | None | Hard film having a pitted surface in part being formed on the surface portion, and many bubbles being present in the inside portion | 92.3 | 16.5 | A large amount of water-insoluble gel being present, but solution being transparent |
| Com. Ex. 6 | None (humidity of atmosphere being kept at 60% by wet nitrogen gas) | The inside portion being hard, but the surface portion being soft and weak | 93.8 | 4.0 | No water-insoluble gel and solution being transparent |
| Com. Ex. 7 | None | The inside portion being hard, but the surface being soft and weak and being heterogeneous due to insufficient polymerization | 81.0 | 3.5 | A large amount of water-insoluble gel being present, but solution being transparent |
| Com. Ex. 8 | None (humidity of atmosphere being kept at 60% by wet nitrogen gas) | The surface portion being soft and being in semi-dissolved state in part | 80.5 | 3.6 | No water-insoluble gel and solution being transparent |

The procedures of Examples 1 to 4 and Comparative Examples 1 and 2 were repeated except that 500 ml of a 75% aqueous solution of N,N,N-trimethylaminoethyl methacrylate chloride adjusted to pH 4 with a 10% hydrochloric acid was employed as an aqueous monomer solution.

The results are shown in Table 2.

EXAMPLES 13 TO 16 AND COMPARATIVE EXAMPLES 7 AND 8

The procedures of Examples 9 to 12 and Comparative Examples 5 and 6 were repeated except that the stopping of nitrogen introduction made after coating

EXAMPLES 17 TO 20

The procedures of Examples 1 to 4 were repeated except that the alkylene oxide adduct shown in Table 3 was employed as a covering material.

The results are shown in Table 3.

EXAMPLES 21 TO 24

The procedures of Examples 17 to 20 were repeated except that the stopping of nitrogen gas introduction made after coating the aqueous monomer solution with the covering material was not made.

The results are shown in Table 3.

TABLE 3

|  | Covering material | State of polymer gel | Conversion (%) | Intrinsic viscosity (dl/g) | Water solubility |
|---|---|---|---|---|---|
| Ex. 17 | Lauryl alcohol-propylene oxide adduct (MW 2000) | Slightly soft surface, but no unreacted monomer | 99.1 | 23.5 | Little water-insoluble gel |
| Ex. 18 | Nonylphenol-propylene oxide adduct (MW 1800) | Slightly soft surface, but no unreactd monomer | 99.3 | 23.8 | Little water-insoluble gel |
| Ex. 19 | Glycerol-propylene oxide adduct (MW 3000) | Slightly soft surface, but no unreacted monomer | 99.5 | 23.2 | Little water-insoluble gel |
| Ex. 20 | Sorbitol-butylene oxide-propylene oxide adduct (butylene oxide/propylene oxide = 2/8 by wt. block adduct) | Slightly soft surface, but no unreacted monomer | 99.2 | 23.0 | Little water-insoluble gel |
| Ex. 21 | Same as Ex. 17 | Homogeneous all over | 99.2 | 22.8 | Little water-insoluble gel |
| Ex. 22 | Same as Ex. 18 | " | 99.0 | 23.5 | Little water-insoluble gel |
| Ex. 23 | Same as Ex. 19 | " | 99.4 | 23.0 | Little water-insoluble gel |
| Ex. 24 | Same as Ex. 20 | " | 99.0 | 22.7 | Little water-insoluble gel |

EXAMPLES 25 TO 28

The procedures of Examples 17 to 20 were repeated except that 500 ml of a 75% aqueous solution of N,N,N-trimethylaminoethyl methacrylate chloride adjusted to pH 4 with a 10% hydrochloric acid was employed as an aqueous monomer solution.
The results are shown in Table 4.

EXAMPLES 29 TO 32

The procedures of Examples 25 to 28 were repeated except that nitrogen gas was introduced to the chamber throughout the polymerization.
The results are shown in Table 4.

TABLE 4

|  | Covering material | State of polymer gel | Conversion (%) | Intrinsic viscosity (dl/g) | Water solubility |
|---|---|---|---|---|---|
| Ex. 25 | Lauryl alcohol-propylene oxide adduct (MW 2000) | Slightly soft surface, but no unreacted monomer | 98.8 | 7.3 | Transparent solution containing no insoluble gel |
| Ex. 26 | Nonylphenol-propylene oxide adduct (MW 1800) | Slightly soft surface, but no unreacted monomer | 98.7 | 7.2 | Transparent solution containing no insoluble gel |
| Ex. 27 | Glycerol-propylene oxide adduct (MW 3000) | Slightly soft surface, but no unreacted monomer | 99.0 | 7.0 | Transparent solution containing no insoluble gel |
| Ex. 28 | Sorbitol-butylene oxide-propylene oxide adduct (butylene oxide/propylene oxide = 2/8 by wt. block adduct) | Slightly soft surface, but no unreacted monomer | 99.2 | 7.0 | Transparent solution containing no insoluble gel |
| Ex. 29 | Same as Ex. 25 | Homogeneous all over | 98.5 | 7.2 | Transparent solution containing no insoluble gel |
| Ex. 30 | Same as Ex. 26 | " | 98.3 | 7.1 | Transparent solution containing no insoluble gel |
| Ex. 31 | Same as Ex. 27 | " | 98.9 | 7.0 | Transparent solution containing no insoluble gel |
| Ex. 32 | Same as Ex. 28 | " | 99.0 | 7.0 | Transparent solution containing no insoluble gel |

EXAMPLE 33

In 500 g of demineralized water was dissolved 400 g of acrylamide, and 20 g of a 1% aqueous solution of potassium persulfate, 5 g of 1% aqueous solution of sodium hydrogensulfite and 1 g of sodium dioctyl sulfosuccinate were dissolved in the obtained aqueous monomer solution. The total amount of the aqueous solution was then adjusted to 1,000 g with demineralized water. The aqueous solution was placed in a degassing vessel, and nitrogen gas was passed through the solution to remove the dissolved oxygen.

The polymerization was carried out in a box-shaped stainless steel polymerization vessel having a size of 100 mm in length, 100 mm in width and 150 mm in height at an atmospheric temperature of 30° C. for 3 hours.

The obtained polymer was hard and in the form of a high elastic gel. The mass of the polymer gel was ground to particles having a particle size of about 3 mm by an electric meat grinder. It was done without burden and heat generation. Even if the particles were pressed hard by hand, they did not adhere to each other.

The coarse particles were then finely divided by a meat grinder having a screen of 2 mm in opening diameter. The state of the particles did not change.

A part of the undried fine particles was allowed to stand in the form of a layer of about 2 cm in thickness under a load of 1 kg/cm² at room temperature for one month. The particles weakly adhered to each other, but were easily returned to the original fine particle state by lightly crumpling. Accordingly, it is possible to put the particles on the market without drying.

Further, 500 g of the particles having a particle size of about 3 mm were placed in a 5 liter fluidized bed dryer (diameter 100 mm and height 150 mm) in the form of a layer of about 25 mm in thickness, and dried by passing hot air of 80° C. The solid content of the particles reached 90% 20 minutes after starting the drying, and no agglomeration of the particles was observed during the drying.

COMPARATIVE EXAMPLES 9 TO 11

The procedures of Example 33 were repeated except that sodium dioctyl sulfosuccinate was not employed (Comparative Example 9), polyoxyethylene glycol ether having a molecular weight of 1,000 was employed instead of sodium dioctyl sulfosuccinate (Comparative Example 10), or sodium dioctyl sulfosuccinate was not employed in the polymerization and the surface of the polymer gel was coated with polyoxyethylene glycol ether having a molecular weight of 1,000 in an amount of 0.25% based on the polymer gel before grinding to coarse particles of 3 mm in particle size (Comparative Example 11). The states of coarse grinding coarse particles and drying were observed.

The results are shown in Table 5.

TABLE 5

| | State of grinding and particles | State of drying |
|---|---|---|
| Com. Ex. 9 | The polymer gel generated heat upon grinding due to a relatively large burden. The coarse particles strongly adhered to each other and assumed a noodle-like form. Thus, it was very difficult to further finely divide the coarse particles. | Agglomeration was marked, and after drying for 20 minutes, only the particle surface was dried, but the inner portion of the particles was still soft. |
| Com. Ex. 10 | Burden in coarse grinding was small, but adhesion of particles to each other was observed. At the time of finely dividing the coarse particles, a part of the particles assumed a noodle-like form. | After 20 minutes, the inside of coarse particles was somewhat sticky, and agglomeration was observed. After about 45 minutes, the inside showed a dried state as well as the particle surface. |
| Com. Ex. 11 | Burden was observed in grinding, and the coarse particles remarkably adhered to each other in part. At the time of finely dividing the coarse particles, the particles assumed a noodle-like form. | After 20 minutes, sticky particles were still much, and the agglomeration was marked. After 65 minutes, the particles showed a nearly completely dried state. |

EXAMPLE 34

The procedures of Example 33 were repeated except that 320 g of acrylamide and 80 g of sodium acrylate were employed instead of 400 g of acrylamide. The states of coarse grinding, particles and drying were observed.

The grinding of the polymer gel into coarse particles by a meat grinder was done without any burden, and the obtained particles were crisp.

Upon finely dividing the coarse particles by a meat grinder having a screen of 2 mm in opening diameter, a little burden was observed, but no heat generation was observed.

After drying the coarse particles of about 3 mm in particle size for 20 minutes, the particles was slightly soft as a whole, but no adhesion of the particles to each other was observed and also no non-uniform drying of the inside of the particles was observed. The particles were almost dried up for 25 minutes.

EXAMPLE 35

The procedures of Example 33 were repeated except that 250 g of acrylamide was employed instead of 400 g of acrylamide. The obtained polymer was in the form of a slightly soft gel.

The polymer gel could be easily ground to coarse particles having a particle size of about 3 mm by an electric meat grinder without heat generation and adhesion of particles to each other.

The coarse particles were then dryed with hot air of 85° C. After about 30 minutes, the solid content of the particles reached 90%, and the adhesion of the particles was merely observed in a very small portion.

COMPARATIVE EXAMPLE 12

The procedures of Example 35 were repeated except that sodium dioctyl sulfosuccinate was not employed.

The burden in grinding by the meat grinder was large, and heat generation was marked. Also, the obtained coarse particles were adhered to each other in a noodle-like form.

The particles were dried for 100 minutes with a hot air of 80° C., but the inside of the particles was still soft and the drying was insufficient.

EXAMPLE 36

The procedures of Example 33 were repeated except that acrylamide was employed in an amount of 250 g, and 2.5 g of nonylphenyl-ethylene oxide adduct (HLB 12) was additionaly employed as a non-ionic surfactant.

The obtained polymer was in the form of a slightly soft gel, but it could be easily ground to particles having a particle size of about 3 mm by a meat grinder without heat generation and adhesion. The coarse particles were allowed to stand in the form of a layer of about 2 cm in thickness under a load of 1 kg/cm$^2$ at room temperature for one month. No change was observed.

The coarse particles were dryed with a hot air of 80° C. After about 25 minutes. the solid content of the particles reached 90% or higher, and no adhesion of the particles to each other was observed.

EXAMPLE 37

The procedures of Example 33 were repeated except that 320 g of acrylamide and 80 g of sodium acrylate were employed instead of 400 g of acrylamide, and 1 g of sodium butyl-2-ethylhexyl sulfosuccinate was employed instead of 1 g of sodium dioctyl sulfosuccinate.

The obtained polymer gel could be ground to coarse particles having a particle size of about 3 mm by a meat grinder without any burden, and the obtained particles had no stickiness.

The coarse particles were then pulverized by a meat grinder having a screen of 2 mm in opening diameter. A slight burden was observed, but heat generation was not observed.

The coarse particles were dried for 20 minutes. The dried particles were slightly soft as a whole, but did not adhere to each other. Also, the inside of the particles was uniformly dried. The particles were almost completely dried by further drying for 25 minutes.

In addition to the ingredients used in the Examples, other ingredients can be used in the Examples as set forth in the specification to obtain substantially the same results.

What we claim is:

1. In a process for preparing a water-soluble high molecular weight polymer by polymerizing a thin layer of an aqueous solution of a water-soluble vinyl monomer supported on a solid support, the improvement which comprises continuously feeding the aqueous monomer solution containing a photopolymerization initiator in the form of a thin layer onto a moving solid support, irradiating ultraviolet rays to the thin layer of the aqueous monomer solution to initiate polymerization and to cause the aqueous monomer solution to become substantially nonflowable, continuously applying a covering material to the surface of the thin layer to cover the surface of the thin layer with the covering material, said material being selected from the group consisting of a substantially water-insoluble organic material and a slightly water-soluble or substantially water-insoluble alkylene oxide adduct; continuing the polymerization by the irradiation of ultraviolet rays, and continuously peeling off the produced polymer from the moving support; the substantially water-insoluble organic material being at least one member selected from the group consisting of a paraffin, a silicon oil, a silicon grease and a polyolefin, and the alkylene oxide adduct having a molecular weight of 500 to 20,000 and being an addition reaction product of an alkylene oxide onto a member selected from the group consisting of an aliphatic alcholol having 1 to 20 carbon atoms, an alkylphenol, a fatty acid having 4 to 22 carbon atoms, a polyol, and a partial fatty acid ester of the polyol, or a mixture of the addition reaction products.

2. The process of claim 1, wherein the surface of said solid support is covered with a tetrafluoroethylene-ethylene copolymer.

3. The process of claim 1, wherein the surface of said solid support is covered with a metal deposited fluorine-containing resin film, the metal deposition layer of which is in contact with the support surface.

4. The process of claim 1, wherein the aqueous monomer solution is a 20 to 60% by weight aqueous solution of acrylamide or a mixture of acrylamide and a minor amount of other vinyl monomers copolymerizable with acrylamide.

5. The process of claim 1, wherein the aqueous monomer solution is a 50 to 85% by weight aqueous solution of a salt with an acid or quaternary salt of a dialkylaminoalkyl acrylate or methacrylate or a mixture thereof with other copolymerizable vinyl monomers.

6. The process of claim 1, wherein the aqueous monomer solution contains a photopolymerization initiator, an aliphatic tertiary amine and at least one surfactant selected from the group consisting of an anionic surfactant having $-SO_3^-$ group and a non-ionic surfactant.

7. The process of claim 6, wherein the anionic surfactant having $-SO_3^-$ group is a dialkyl sulfosuccinate.

8. The process of claim 1, wherein the aqueous monomer solution contains a water-soluble cellulose derivative.

9. The process of claim 1, wherein the aqueous monomer solution contains a hypophosphite or a mixture of a hypophosphite and a tertiary amine.

10. The process of claim 1, wherein the aqueous monomer solution contains a dialkyl sulfosuccinate.

11. The process of claim 1, wherein the polymerization is carried out by subjecting an aqueous solution of a monomer containing a member selected from the group consisting of acrylamide and acrylic acid to irradiation of ultraviolet rays, and to the produced polymer is added an aminocarboxylic acid having hydroxyl group or a mixture of the aminocarboxylic acid having hydroxyl group and an aminocarboxylic acid having no hydroxyl group or a urea compound.

12. The process of claim 1, wherein the polymerization is carried out by subjecting the aqueous monomer solution in the form of a layer having a thickness of 3 to 10 mm on a moving support to irradiation of ultraviolet rays having a wavelength of 300 to 450 millimicrons with an intensity on the support surface of to 50 W/m$^2$.

13. The process of claim 1, wherein the concentration of dissolved oxygen in the aqueous monomer solution is at most 0.5 p.p.m. and the polymerization is carried out in an atmosphere containing at most 0.5% by volume of oxygen.

* * * * *